United States Patent Office 3,455,957
Patented July 15, 1969

3,455,957
DIHYDROPYRAN PERFUME
Arno Cahn, Pearl River, N.Y., Ronald Ross Winnegrad, West Englewood, and Allan H. Gilbert, Cresskill, N.J., assignors to Lever Brothers Company, New York, N.Y., a corporation of Maine
No Drawing. Original application Oct. 21, 1963, Ser. No. 317,779, now Patent No. 3,309,276, dated Mar. 14, 1967. Divided and this application Sept. 7, 1966, Ser. No. 600,284
Int. Cl. C07d 7/08; C11b 9/00; A61k 7/00
U.S. Cl. 260—345.1                    3 Claims

ABSTRACT OF THE DISCLOSURE

This specification is concerned with a dihydropyran compound which is useful as a perfume alone or in combination with another perfume to form a perfume blend. The specification also is concerned with a process for reacting a diol directly with mesityl oxide to provide a perfumy compound.

---

This is a divisional application of Ser. No. 317,779, filed Oct. 21, 1963, now U.S. Patent No. 3,309,276.

This invention relates to a process for preparing a perfume. More particularly, it relates to a perfume and a perfume blend therefrom.

It is known that dihydropyran compounds can be provided by reacting an unsaturated alcohol with a ketone or an aldeyhde (U.S. Pat. Nos. 2,422,648 and 2,452,977). It is also known that dihydropyran compounds can be provided as a by-product in the dehydration of a glycol to a diene (U.S. Pat. No. 2,422,802). Other methods for preparing dihydropyrans or pyran derivatives are disclosed in U.S. Pat. Nos. 2,514,168, 2,365,623, 2,603,650, 2,976,299, 2,858,322, 2,610,193, 2,576,323 and 2,868,805. The aforementioned dihydropyrans have been employed as insecticides; fungicides; parasiticides; solvents; biologically active materials; chemical intermediates; and re-agents and additives for resins, plastics and rubbers.

It has now been discovered that a certain dihydropyran imparts an intense top note to rose and enhances the rose note of a perfume blend. Thus, in accordance with one embodiment of this invention, a perfume has been provided having the following structure:

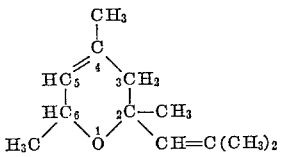

As defined herein, this structure, i.e., 2-(2-methyl-1-propenyl)-2,4,6-trimethyldihydro-4,5-pyran, includes the structure isomeric therewith.

For the success of the present invention, it is necessary to have 2-methyl-1-propenyl in the 2-position. For example, if the 2-position has n-hexyl or i-butyl, the dihydropyran therefrom is not a perfume. Dihydropyrans with other substituents in the ring, e.g., 2-i-butyl-4,6-dimethyldihydro-4,5-pyran and 2-(1-propenyl)-4,6-dimethyldihydro-4,5-pyran, also do not have any perfumy properties.

A second embodiment of this invention is the process for preparing the perfume, 2-(2-methyl-1-propenyl)-2,4,6-trimethyldihydro-4,5-pyran. It has been found that this perfume may be provided by reacting 2-methyl-2,4-pentanediol directly with mesityle oxide in a homogeneous aqueous solution. Therefore, a separate step is not required in this in situ process to form 4-methyl-4-pentene-2-ol as an intermediate product. The reaction is generally conducted in the presence of an acid catalyst, e.g., sulfuric acid, with refluxing. After the reaction is complete, e.g., after 24 hours, the solution therefrom is cooled, neutralized and distilled to form 2-(2-methyl-1-propenyl)-2,4,6-trimethyldihydro-4,5-pyran, a perfume.

One of the reactants in the present invention is mesityl oxide. This ketone having the structure:

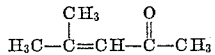

is extrenally prepared by any method known in the art. A suitable method, for example, is the dehydration of diacetone alcohol. The other reactant herein is 2-methyl-2,4-pentanediol having the structure:

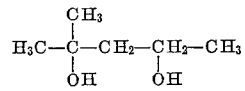

This diol may also be prepared by any known method.

Although 2-(2-methyl-1-propenyl)-2,4,6 - trimethyl-dihydro-4,5-pyran alone is considered to be a perfume, it is generally employed in combination with other perfumes as a perfume blend. This perfume blend is a third embodiment of the instant invention. A suitable composition, for example, may be provided by blending 1 to 50 parts of 2-(2 - methyl - 1 - propenyl)-2,4,6-trimethyldihydro - 4,5 - pyran with 100 parts of other perfumy materials. Any known perfumes may be used in the blend with 2-(2-methyl-1-propenyl) - 2,4,6 - trimethyldihydro - 4,5-pyran. As defined herein, "a perfume" is a substance, natural or synthetic, that emits a pleasant fragrance, i.e., an agreeable odor, which is usually a fluid preparation used for scenting. This includes the following compounds among others: citronellyl formate, citronellol, labdanum resin, nerol, menthone, geraniol, trans-decahydro-β-naphthol, benzoylphenone, artifical musk, phenyl ethyl acetate, benzyl acetate, ionone, phenyl ethyl alcohol and mixtures thereof. However, the preferred perfume blends are those which have an intense top note to rose; for example, a blend of 2-(2-methyl-1-propenyl)-2,4,6-trimethyldihydro-4,5-pyran, citronellol, geraniol, phenyl ethyl alcohol, ionone, and benzyl acetate. As defined herein, "top note to rose" includes the geranium note.

Thus, in accordance with this invention, a synthetic perfume has been provided. It is significant that this perfume, i.e., 2-(2-methyl-1-propenyl)-2,4,6-trimethyldihydro-4,5-pyran, can be formed directly from a diol reactant thereby eliminating a step heretofore employed for preparing dihypdropyrans in general.

Furthermore, it is now possible to manufacture a perfume composition comprising 2-(2-methyl-1-propenyl)-2,4,6-trimethyldihydro-4,5-pyran and another perfumy compound. A surprising and unexpected feature of this invention is the discovery that 2-(2-methyl-1-propenyl)-2,4,6-trimethyldihydro-4,5-pyran has the unique property of imparting strength and brightness to a rose blend which, without 2 - (2-methyl-1-propenyl)-2,4,6-trimethyldihydro-4,5-pyran, would be relatively weak. 2-(2-methyl-1-propenyl)-2,4,6-trimethyldihydro-4,5-pyran may also be useful in covering the pungent ordors of petroleum and other hydrocarbons. Moreover, 2-(2-methyl-1-propenyl)-2,4,6-trimethyldihydro-4,5-pyran is stable in alkaline liquid media, e.g., soaps and detergents.

The following examples are submitted to illustrate but not to limit this invention. Unless otherwise indicated, all parts and percentages in the specification are based on weight.

Example I

Mesityl oxide (98 g., 1 mol) and 2-methyl-2,4-pentanediol (130 g., 1.1 mol) were refluxed for 24 hours in 1 ml. of concentrated sulfuric acid and 5 ml. of water. The solution therefrom was cooled, neutralized with alcoholic sodium hydroxide and distilled to yield 45 g. (25%) of an oil (B.P. 72–83° C./11 mm.). This oily reaction product, i.e., 2-(2-methyl-1-propenyl)-2,4,6-trimethyldihydro-4,5-pyran, was a light yellow perfume.

Example II

The compounds indicated in Table I were also prepared.

TABLE I

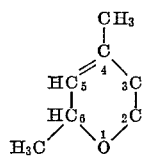

| Compound No. | R₁-substituent | R₂-substituent |
|---|---|---|
| 1 | Methyl | i-Butyl. |
| 2 | Hydrogen | Do. |
| 3 | do | 1-Propenyl. |
| 4 | Methyl | n-Hexyl. |

None of the compounds in Table I were considered to be perfumes.

Examples I and II demonstrate the criticality of having on dihydropyran a 2-methyl-1-propenyl substituent in the 2-position and methyl substituents in the 2,4,6-positions in order to have the desired odoriferous properties.

Example III

Perfume compositions were formed from 2-(2-methyl-1-propenyl)-2,4,6-trimethyldihydro-4,5-pyran and other compounds. These compositions are indicated in Table II herebelow.

TABLE II

| Ingredients | Compositions, parts by weight | |
|---|---|---|
| | (1) | (2) |
| Citronellol | 200 | 400 |
| Geraniol | 100 | |
| Phenyl ethyl alcohol | 200 | |
| Ionone | 30 | |
| Benzyl acetate | 100 | |
| Benzoylphenone | | 100 |
| Phenyl ethyl acetate | | 60 |
| Artificial musk | | 10 |
| 2-(2-methyl-1-propenyl)-2,4,6-trimethyldihydro-4,5-pyran | 50 | 200 |

Both composition (1) and composition (2) had an intense top note to rose.

Example IV

The perfume blend shown in Table III is considered to have a strong, bright rose note.

TABLE III

| Ingredients: | Parts by wt. |
|---|---|
| 2-(2-methyl-1-propenyl)-2,4,6-trimethyldihydro-4,5-pyran | 15 |
| Geraniol | 10 |
| Nerol | 10 |
| Citronellol | 50 |
| Menthone | 5 |
| Citronellyl formate | 10 |

Having set forth the general nature and specific embodiments of the present invention, the true scope is now particularly pointed out in the appended claims.

What is claimed is:

1. A perfume having the structure:

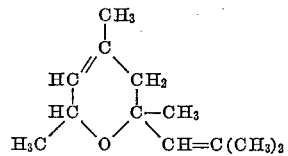

2. A process which comprises reacting 2-methyl-2,4-pentanediol directly with mesityl oxide in a homogeneous aqueous solution to provide a perfume having the structure:

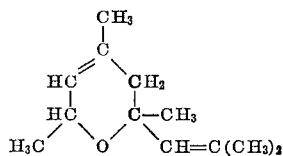

3. A process which comprises reacting 2-methyl-2,4-pentanediol directly with externally prepared mesityl oxide in a homogeneous aqueous solution in the presence of an acid catalyst with refluxing; cooling; neutralizing; and distilling to provide a perfume having the structure:

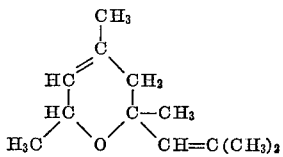

References Cited

UNITED STATES PATENTS

| 3,166,576 | 1/1965 | Markus | 260—345.1 |
| 3,309,276 | 3/1967 | Cahn et al. | 260—345.1 XR |

HENRY R. JILES, Primary Examiner

JOHN M. FORD, Assistant Examiner

U.S. Cl. X.R.

252—522